United States Patent [19]

Edler et al.

[11] Patent Number: 5,156,830
[45] Date of Patent: * Oct. 20, 1992

[54] PROCESS FOR PREPARING AN ALPHA-PHASE SILICON NITRIDE MATERIAL AND THEREAFTER CONVERTING TO NON-DENSIFIED BETA-PHASE MATERIAL

[75] Inventors: James P. Edler; Bohdan Lisowsky, both of Troy, Mich.

[73] Assignee: Eaton Corporation, Cleveland, Ohio

[*] Notice: The portion of the term of this patent subsequent to Jul. 24, 2007 has been disclaimed.

[21] Appl. No.: 557,582

[22] Filed: Jul. 24, 1990

[51] Int. Cl.$^5$ .................. C01B 21/06; C04B 35/58
[52] U.S. Cl. ............................. 423/344; 264/65; 264/66; 423/406; 501/97
[58] Field of Search ............ 423/344, 406; 501/97, 501/98; 264/63, 65, 66, 86

[56] References Cited

U.S. PATENT DOCUMENTS

| | | | |
|---|---|---|---|
| 2,268,589 | 1/1942 | Henny | 264/56 |
| 2,869,215 | 1/1959 | Smith | 264/28 |
| 3,205,080 | 9/1965 | Ryshkewitch | 561/88 |
| 3,222,438 | 12/1965 | Parr et al. | 264/66 |
| 3,669,723 | 6/1972 | Parr et al. | 427/133 |
| 3,819,786 | 6/1974 | May | 204/63 |
| 3,887,412 | 6/1975 | Styhr et al. | 156/89 |
| 3,950,464 | 4/1976 | Masaki | 303/7 |
| 3,991,166 | 11/1976 | Jack et al. | 423/327 |
| 3,992,497 | 11/1976 | Terwilliger et al. | 264/56 |
| 4,033,400 | 7/1977 | Gurwell et al. | 164/98 |
| 4,036,653 | 7/1977 | Jacobson | 437/241 |
| 4,067,943 | 1/1978 | Ezis et al. | 264/86 |
| 4,119,689 | 10/1978 | Prochazka et al. | 264/65 |
| 4,164,528 | 8/1979 | Yajima et al. | 264/62 |
| 4,235,857 | 11/1980 | Mangels | 431/3 |
| 4,285,895 | 8/1981 | Mangels et al. | 264/65 |
| 4,354,990 | 10/1982 | Martinengo et al. | 264/65 |
| 4,356,136 | 10/1982 | Mangels | 264/65 |
| 4,376,742 | 3/1983 | Mah | 264/85 |
| 4,377,542 | 3/1983 | Mangels et al. | 264/65 |
| 4,410,636 | 10/1983 | Minjolle et al. | 561/98 |
| 4,443,394 | 4/1984 | Ezis | 264/65 |
| 4,471,060 | 9/1984 | Dickie et al. | 561/151 |
| 4,519,967 | 5/1985 | Crosbie et al. | 264/86 |
| 4,626,422 | 12/1986 | Ritsko et al. | 423/344 |
| 4,717,693 | 1/1988 | Wittmer | 501/97 |
| 4,781,874 | 11/1988 | Edler | 264/65 |
| 4,888,142 | 12/1989 | Hayashi et al. | 264/65 |
| 4,943,401 | 7/1990 | Edler et al. | 264/63 |

FOREIGN PATENT DOCUMENTS 076549 6/1977 Japan.
081250 5/1983 Japan.

OTHER PUBLICATIONS

Sacks, et al., Properties of Silicon Suspensions and Slip-Cast Bodies, 1985, 1109–1123.
Jahn, Processing of Reaction Bonded Silicon Nitride, 1989, 1–24.
Williams, et al., Slip Casting of Silicon Shapes and Their Nitriding, 1983, pp. 607–619.
Mangels, Effect of Rate-Controlled Nitriding and Nitriding Atmospheres on the Formation of Reaction-Bonded $Si_3N_4$, 1981, pp. 613–617.
Moulson et al., Nitridation of High-Purity Silicon, 1975, pp. 285–289.
Shaw et al., Thermodynamics of Silicon Nitridation: Effect of Hydrogen, 1982, pp. 180–181.
Moulson, Reaction-Bonded Silicon Nitride: Its Formation and Properties, 1979, pp. 1017–1051.

*Primary Examiner*—Olik Chaudhuri
*Assistant Examiner*—Ken Horton
*Attorney, Agent, or Firm*—P. S. Rulon; L. E. Cargill

[57] ABSTRACT

A process for preparing an alpha-phase silicon nitride material and thereafter converting to non-densified beta-phase silicon nitride material includes comminuting a slurry including a mixture of silicon powder and water to form non-oxidized surfaces on the silicon powder and to allow chemical reaction between the silicon and water, reducing the water content of the reacted slurry to a degree sufficient to form a resultant dry mass, nitriding the dry mass by exposure to a nitriding gas including at least nitrogen to form a mass of alpha-phase silicon nitride, and converting the resultant silicon nitride mass at a conversion temperature of from about 1450° C. to about 2100° C. to convert the silicon nitride from an alpha-phase material to a non-densified beta phase silicon nitride material.

53 Claims, No Drawings

PROCESS FOR PREPARING AN ALPHA-PHASE SILICON NITRIDE MATERIAL AND THEREAFTER CONVERTING TO NON-DENSIFIED BETA-PHASE MATERIAL

TECHNICAL FIELD

This invention relates generally to methods of making an alpha-phase silicon nitride material and converting it to non-densified beta-phase silicon nitride, and more particularly relates to using silicon which has been chemically reacted with water, and then processed. This application also relates to co-pending applications entitled Process For Making Silicon Nitride Articles; Process For Preparing A Nitridable Silicon-Containing Material Having At Least One Densification Aid Including Alumina, And The Material Resulting Therefrom; New Ceramic Phase In Sintered Silicon Nitride Containing Cerium, Aluminum, And Iron; Process For Preparing A Densified Beta-Phase Silicon Nitride Material Having At Least One Densification Aid, And The Material Resulting Therefrom; Process For Nitriding Silicon-Containing Materials; and Process For Preparing A Base Nitridable Silicon-Containing Material And The Material Resulting Therefrom, filed on the same day herewith, the same are also incorporated herein by reference.

BACKGROUND OF THE INVENTION

Alpha-phase silicon nitride material has been made in a variety of ways, most of them expensive, time and labor intensive. It is desirable to produce a high alpha-phase content silicon nitride from an inexpensive starting material in order to be later processed into various products. For some applications, such as refractory products, it is advantageous to convert the alpha-phase silicon nitride material to beta-phase silicon nitride material. Beta-phase material may either be in the form of densified or non-densified silicon nitride. To form densified silicon nitride material, there generally is a requirement for the inclusion of densification aids, or liquid forming agents. To form non-densified beta-phase, densifying agents must not be present in the alpha-phase silicon nitride body.

Heat treatment of the alpha silicon nitride above 1450° C. can result in either densified or nondensified beta-phase material. In order for the alpha-phase material to be sintered and converted into densified beta-phase material, either densification aids or liquid forming agents must be included in the alpha-silicon nitride body before the sintering temperature is reached and maintained for a sufficiently long time to sinter the material. There are some applications, particularly as refractories, for which a non-densified beta-phase material is desirable. This material can be formed by heat treatment above 1450° C., from an alpha-phase silicon nitride not containing densification aids.

Densification of silicon nitride occurs by the transformation of the alpha phase of silicon nitride into the beta phase of silicon nitride in the presence of a high temperature liquid phase, accompanied by about a 10–12 percent reduction in volume. The liquid phase promotes the conversion of the alpha-phase silicon nitride to the densified beta phase silicon nitride during sintering or densification. It has been found that densification does not generally occur without liquid forming agents. When alpha-phase material is subjected to high temperatures, conversion may be directly to beta-phase material without changes in volume, and consequently no densification.

In the past there has been a major problem associated with the processing of reaction bonded silicon nitride which is the extensive time required for preparation and nitridation of the silicon powder. Typically, in order to manufacture a reaction bonded silicon nitride, very pure silicon has been ground and mixed dry with sintering aids for long periods of time, upwards of 48 hours, and then nitrided for long times, on the order of hundreds of hours to weeks. Total fabrication times of 200 to 400 hours are not uncommon.

Reaction bonded silicon nitride is commonly prepared by reacting and nitriding the silicon (either as a powder or as a formed article) with nitrogen by exposing the silicon to a nitrogen-containing atmosphere at temperatures of to about 1420° C. for times sufficient to produce the silicon nitride. It is not uncommon for the nitriding time in prior art methods to be 100–200 hours. It is normal for a small amount of nitriding aid (e.g., iron oxide or nickel oxide) to be initially mixed with the silicon powder to enhance the nitridation of the silicon during the nitriding step.

U.S. Pat. No. 4,285,895 to Mangels et al. teaches that sintered reaction bonded silicon nitride articles can be made by incorporation of a densification aid into the reaction bonded silicon nitride article, surrounding the article with a packing powder of silicon nitride and densification aid and subjecting the article and powder mixture to a temperature above 1700° C. with a nitrogen atmosphere of sufficient pressure to prevent volatilization of the silicon nitride for a time sufficient to permit sintering of the reaction bonded silicon nitride articles.

Several methods for introducing the densification aid into the reaction bonded silicon nitride article are disclosed in the above referenced Mangels et al. patent. These include (1) the impregnation of the densification aid into the reaction bonded silicon nitride article; (2) incorporation of the densification aid into the cover powder and then relying upon diffusion of that densification aid into the article at the sintering temperature; and (3) incorporation of the densification aid into the silicon powder mix prior to nitriding. The densification aids cited are magnesium oxide, yttrium oxide, cerium oxide, and zirconium oxide. The Mangels et al. patent also teaches that the nitrogen pressure at the sintering temperature may be in the range of 250 to 1500 psi.

U.S. Pat. No. 4,351,787 to Martinengo et al. teaches that sintered silicon nitride articles can be prepared by forming a silicon powder mixture containing one or more sintering additives into a compact, the additives being present in the powder in an amount such as to ensure an additive content of from 0.5 to 20 wt % in the silicon nitride compact; heating the compact under a nitrogen gas blanket at a temperature not exceeding 1500° C. to convert the silicon into reaction bonded silicon nitride; and sintering the reaction bonded silicon nitride compact by heating in a nitrogen gas atmosphere at a temperature of at least 1500° C. Furthermore, it is taught that the silicon powder size is from 0.1 to 44 microns in size and of high purity or containing only very small amounts of nitriding catalysts. The Martinengo et al. patent teaches that any conventional sintering additive may be used. Best results are said to be achieved by using MgO, and especially in combination with $Y_2O_3$. Other preferred additives mentioned in the patent are MgO, $Y_2O_3$, $CeO_2$, $ZrO_2$, BeO, $Mg_3N_2$, and AlN. Other examples of additives are given as $Mg_2Si$, $MgAl_2O_4$, and rare earth additions such as $La_2O_3$. Also iron can be used with advantage, usually in mixture with conventional additives such as MgO, $Y_2O_3$, and $CeO_2$.

As a final example of sintered reaction bonded silicon nitride practice, reference is made to U.S. Pat. No. 4,443,394 to Ezis which teaches a method for making a fully densified silicon nitride body. The basic principle taught is that silicon nitride will not sinter by itself, but requires a liquid phase at the sintering temperature. Ezis found that, by having an yttrium oxynitride and alumino-silicate liquid phase present at sintering temperatures of 1650°–1750° C., the need for an over pressure of nitrogen and cover or packing powder during sintering could be eliminated in order to densify the silicon nitride.

The Ezis patent teaches that, by (1) forming a nitridable mixture of: silicon powder, $SiO_2$ (carried with the Si metal), $Y_2O_3$ and $Al_2O_3$; (2) nitriding the mixture to form a reaction bonded silicon nitride, with consequent formation of a $Y_{10}Si_6O_{24}N_2$ phase, and an alumino-silicate which resides on the silicon nitride grains; and then (3) sintering in the 1650° to 1750° C. temperature range for 5–12 hours, a substantially fully densified silicon nitride is produced which exhibits a 4-point bending strength of 100,000 psi at room temperature.

The Ezis patent further teaches the need for a long ball milling time of 48 hours, preferably dry, a nitridation cycle time of 200 hours, and sintering times of 5–12 hours. Total processing time including the milling can be estimated from the preferred embodiment as approximately 260 hours.

It is, therefore, a primary object of the present invention to provide a process for making a body of non-densified beta-phase material from a high alpha-phase content starting material.

SUMMARY OF THE INVENTION

In accordance with the preferred embodiment of the invention, this and other objects and advantages are addressed as follows. Methods are disclosed for preparing a non-densified beta-phase material which is formed from readily available silicon-containing powders which are first reacted to form alpha-phase silicon nitride and then converted by use of a high temperature heat treatment into non-densified beta-phase silicon nitride. A unique feature of this process is that the inclusion of densifying agents into the base slurry will allow for the manufacture of a densified beta-phase silicon nitride material as described in co-pending applications entitled Process For Preparing A Nitridable Silicon-Containing Material Having A Least One Densification Aid Including Alumina, And The Material Resulting Therefrom; and Process For Preparing A Densified Beta-Phase Silicon Nitride Material Having At Least One Densification Aid, And The Material Resulting Therefrom.

A method is disclosed for preparing such a non-densified beta-phase material which includes comminuting a homogeneous slurry including a mixture of silicon powder and water. The comminuting is performed to form non-oxidized surfaces on the silicon powder and to allow substantial chemical reaction between the silicon and the water. A dispersing agent such as Darvan No. 1 or 6, a registered trademark of the R. T. Vanderbilt Company, Inc. may be added initially to aid the comminution. Comminution of the operative chemical compounds with water is conducted for a period of 1 to 5 hours, to produce a silicon based slurry. Thereafter, the water content of the reacted slurry is reduced to a degree sufficient to form a nitridable dry mass.

Organic additives such as binders, plasticizers, viscosity modifiers, and dispersing agents may be added to the slurry toward the end of the comminution. The slurry may then be aged for a period of 12 to 24 hours to allow the reaction of the silicon with the water to substantially reach completion which is believed to provide a silicon oxyhydride coating on the silicon. The aged slurry is then dried by spray drying or any other suitable technique and formed into a green body, if desired, such as by compaction of the spray-dried granules. Slip casting of the original slip, extrusion, injection molding or any other known method for forming green ceramic bodies may likewise be employed. Thereafter, nitriding the dry mass is accomplished by exposure to a nitriding gas, including at least nitrogen gas, to form a mass of silicon material which is predominantly in the alpha-phase. Then, the resultant non-densified beta-phase silicon nitride material is made by converting the resultant silicon nitride mass at a conversion temperature of from about 1450° C. to about 2100° C. for a sufficient length of time to convert the silicon nitride from the alpha-phase material to a non-densified beta-phase silicon nitride material.

DETAILED DESCRIPTION OF THE INVENTION

The processes of this invention generally include processes for preparing a non-densified beta-phase silicon nitride material, as well as the material made therefrom. The material may be made in the form of a powder or an article. The process includes comminuting a slurry including a mixture of silicon powder or a silicon-containing material such as silicon powder with silicon nitride or other grog, and water, the comminuting being performed to form non-oxidized surfaces on the silicon powder and to allow substantial chemical reaction between the silicon powder and the water, reducing the water content of the reacted slurry to a degree sufficient to form a nitridable mass, nitriding the dry mass by exposure to a nitriding gas including at least nitrogen to form a mass of silicon nitride material which is predominantly in the alpha-phase, and converting the resulting silicon nitride mass at a conversion temperature of from about 1450° C. to about 2100° C. to convert the silicon nitride from the alpha-phase material to a non-densified beta-phase silicon nitride material.

In addition, at least one nitriding agent may be added at about 0.5 to 7 volume percent based upon the volume of the resultant dry mass to aid in any later nitriding process. The at least one nitriding agent may be selected from the group consisting of iron oxides, lead oxides, nickel carbonyl, nickel oxides, silicon carbide, graphite, carbon, aluminum oxides, $Fe_2O_3$, NiO, CoO, CaF, PbO, $Li_2O$, $Na_2O$, $K_2O$, BaO, BN, albite ($NaAlSi_3O_8$), orthclase ($KAlSi_3O_8$), anorthite ($CaAl_2Si_2O_8$), nepheline syenite, talc, borax, soda ash, $Pb_3O_4$, alpha-phase $Si_3N_4$ and mixtures thereof.

The process of this invention relating to the making of powders and bodies generally begins with comminuting silicon powder in the presence of a large amount of water to form a slurry. The slurry components are employed in amounts such that the mixture consists of 10–60 volume % solids and 90 to 40 volume % water, wherein the solids consist of silicon powder, nitriding agents, and any other solids which may have been added. The silicon powder may be commercial-grade and preferably has a particle size of less than 20 micrometers. The comminuting is performed by ball milling, preferably for greater than two hours, until the silicon powder size is predominantly less than 10 microns. A dispersing aid may also be added into the slurry in the comminuting step to aid the comminution process. In addition, admixing organic additives to the slurry before substantially reducing its water content may effect the physical properties of the silicon mixture, or of resulting products. These organic additives may be selected from the group consisting of binders, lubricants, plasticizers, and viscosity modifiers including dispersing agents The admixing may be accomplished by comminuting the slurry with the organic additives for at least 30 minutes after the organic additives are admixed. Evolving gases should be periodically vented from the reacting slurry to avoid explosion.

For comminuting, any suitable comminution device may be used such as a ball mill, rod mill, vibratory grinder, Union Process grinder, jet mill, cone grinder, jaw crusher, and hammer mill. The slurry is preferably prepared in a ball mill which is 25–50 volume % filled with milling media and 25–50 volume % filled with the slurry.

The comminuting of the silicon in the presence of water is an important step, as the comminuting creates unoxidized surfaces on the silicon powder particles for vigorous reaction with the water. Merely mixing silicon powder, whether or not pre-ground, with water does not appear to create the fast, vigorous reaction that comminuting provides. Pre-ground silicon powder is not as reactive toward water because silicon, being a highly reactive metal, readily oxidizes in air during storage. Thus, a passivating layer of silicon oxide is formed on the outside of the silicon particles, thereby rendering the silicon not nearly as reactive as unoxidized silicon such as is created during the comminution step.

After comminuting, the slurry is allowed to react further by aging the slurry in the absence of comminuting to allow the chemical reaction to be substantially completed. It is believed that the silicon is chemically reacting with the water during the aging step to form a silicon oxyhydrate coating on the silicon particles and also releasing hydrogen gas as a product of the reaction. During aging, the slip appears to increase in volume by at least 50%, typically doubling its volume through frothing, and, subsequently, the frothing subsides after about 12 hours as the reaction nears completion and the slip develops thixotropic properties.

After aging, the reacted slurry is dried and formed, if desired, in preparation for a subsequent nitriding step. Although the slurry could be slip cast at this point to form a green body or dried for use in extrusion or injection molding of shapes, it is preferred to spray dry the slip to obtain a homogeneous free-flowing powder for isopressing or dry compression forming using standard powder metal presses. Reducing the water content may be performed by spray drying, slip casting, extrusion, injection molding, or tape casting. The resulting dry mass may be formed into an article before exposing the article to the nitriding atmosphere or isopressing, dry pressing, extruding, injection molding, or slip casting. If binders are used, the compact will have a sufficient strength to allow machining without the need for special heat treatments by partially nitriding or sintering the silicon compact. Preferably, required machining is completed on the silicon green body prior to nitriding, rather than on the harder silicon nitride part.

The powder or the compacted parts are then put into a furnace. The furnace is evacuated and preferably filled with a combustible gas atmosphere such as pure hydrogen gas. The temperature of the furnace is then increased from room temperature to about 1000° C. over about 1 to 5 hours, while flowing the combustible gas therethrough, by a nearly linear progression of increasing temperature while flowing hydrogen through the furnace at atmospheric pressure to burn off the organic additive materials without causing any substantial damage to the powder or compacted parts. The substantially non-toxic effluent which is vented includes carbon dioxide and water.

The furnace may then be purged with flowing nitrogen to obtain a noncombustible atmosphere and evacuated again to remove the nitrogen and any remaining effluent. Helium gas may be added, preferably until a pressure of 50 KPa absolute is indicated. Then a nitrogen-hydrogen gas blend consisting of 4 weight percent hydrogen and 96 weight percent nitrogen may be admitted to the furnace until the pressure is preferably slightly above atmospheric pressure (approximately 120 KPa absolute) to avoid any leakage of ambient air into the furnace. The nitriding atmosphere comprises from about 40 to about 60 mole percent nitrogen, from about 40 to about 60 mole percent helium, and from about 1 to about 4 mole percent nitrogen. The resulting partial pressure in the above-described nitriding atmosphere constituents are nitrogen, helium and hydrogen at 48%, 50% and 2%, respectively.

The temperature is then preferably increased from 1000° C. to a nitriding temperature of between 1350° C. and 1450° C., preferably about 1420° C., at a linear rate of about 5° C. to 50° C./hr, although 15° C. to 25° C. per hour is preferred. During this heating cycle, nitrogen is consumed by the silicon to form silicon nitride. The nitriding atmosphere composition in the furnace atmosphere is kept substantially constant by monitored addition of substantially pure nitrogen gas into the furnace to maintain the slightly greater than atmospheric pressure. Once 1420° C. is reached, the temperature is maintained for less than about 2 hours, and preferably for about 1 hour; then the heat source is shut off and the silicon nitride articles are allowed to cool. This nitriding step produces a mass of silicon nitride material which is predominantly in the alpha-phase. As discussed above, it is advantageous for the nitrided silicon to be a high alpha-phase content silicon nitride.

After the nitriding step, the next step involves converting the resultant silicon nitride mass at a conversion temperature of from about 1500° C. to about 2100° C. to convert the silicon nitride material from a predominantly alpha-phase material to a predominantly non-densified beta-phase silicon nitride material. The conversion generally includes utilizing at least a nitrogen-containing atmosphere, and more specifically may include nitrogen and helium, nitrogen and hydrogen, nitrogen, helium and hydrogen, or it may include the same atmosphere at the nitriding atmospheric gas used during the nitriding step. The conversion step may also utilize an atmosphere containing substantially pure nitrogen.

The conversion step may be performed under vacuum from the end of the nitriding step to the beginning of the conversion step, followed by an atmosphere containing at least nitrogen admitted during the duration of the converting step. In addition, the conversion step may be accomplished while utilizing the above-described conversion atmosphere at a pressure of from vacuum to about atmospheric pressure, or from atmospheric to about 150 psig, and preferably at a partial pressure of about 50 psig or greater than 50 psig while utilizing at least nitrogen in the conversion atmosphere. Specifically, it is preferred that the conversion step be accomplished while heating from the temperature achieved at the end of the nitriding step to the beginning of the conversion step at an increasing rate of from about 250° C. to about 1250° C. per hour until an elevated temperature of about 1450° C. to about 2100° C. is reached. The increasing rate may include from about 500° C. to about 1000° C. per hour until the elevated temperature is reached. Preferably, the increasing rate is at about 500° C. per hour until the elevated temperature is reached. The conversion step is accomplished by maintaining a temperature of between about 1450° C. to about 2100° C., and preferably between about 1650° C. to about 1850° C. until substantially all of the silicon nitride in the alpha phase is converted to non-densified beta-phase silicon nitride. This is done by maintaining the conversion temperature for about 0.3 to about 20 hours until substantially all of the conversion takes place, preferably from about 5 to about 10 hours, and most preferably between about 1 to 2 hours.

After the conversion step, a cooling down step may also be included which cools down the resulting non-densified silicon nitride mass from the conversion temperature back to room temperature at a rate of from about 250° C. to about 1250° C. per hour, preferably from about 500° C. to about 1000° C. per hour, and most preferably at about 500° C. per hour until room temperature is reached. Samples prepared by this method display excellent properties, low size distortion and high material integrity. The non-densified beta-phase silicon nitride material which results from this method has found particular utility in applications which require a stable high temperature material.

Thus, there is provided in accordance with the present invention a method for preparing a non-densified beta-phase silicon nitride material which uses materials that are less expensive and more readily available than prior art materials.

What is claimed is:

1. A process for preparing an alpha-phase silicon nitride material and thereafter converting to non-densified beta-phase silicon nitride material, comprising:
   (a) comminuting a slurry including a mixture of
      (i) silicon-containing powder, and
      (ii) water,
      said comminuting being performed to form non-oxidized surfaces on the silicon powder and to allow chemical reaction between the silicon and the water;
   (b) reducing the water content of the reacted slurry to a degree sufficient to form a resultant dry mass;
   (c) nitriding the dry mass by exposure to a nitriding gas including at least nitrogen to form a mass of silicon nitride material which is predominantly in the alpha-phase; and
   (d) converting the resultant silicon nitride mass at a conversion temperature of from about 1450° C. to about 2100° C. to convert the silicon nitride from an alpha-phase material to non-densified beta phase silicon nitride material.

2. The process of claim 1, wherein said comminuting is performed by a method selected from the group consisting of ball milling, rod milling, vibratory grinding, Union Process grinding, jet milling, cone grinding, jaw crushing, and hammer milling.

3. The process of claim 1, wherein said comminuting is performed by ball milling.

4. The process of claim 1, wherein said comminuting is performed until the silicon powder size is less than 10 microns.

5. The process of claim 1, wherein said comminuting is performed for greater than two hours.

6. The process of claim 1, further comprising admixing a dispersing aid into the slurry in the comminuting step.

7. The process of claim 1, further comprising admixing organic additives to the slurry before reducing its water content to effect the physical properties of the silicon mixture.

8. The process of claim 7, wherein said organic additives are selected from the group consisting of binders, lubricants, plasticizers, and viscosity modifiers including dispersing agents.

9. The process of claim 7, wherein said admixing is accomplished by comminuting the slurry with the organic additives for at least 30 minutes after said organic additives are admixed.

10. The process of claim 1, further comprising the step of at least periodically venting the evolving gases from the reacting slurry.

11. The process of claim 1, further comprising a step of aging the comminuted slurry in the absence of comminuting for a period of time sufficient to allow the chemical reaction to be completed.

12. The process of claim 1, wherein reducing the water content is performed by a method selected from the group consisting of spray drying, slip casting, extrusion, injection molding, and tape casting.

13. The process of claim 1, further comprising a step of forming the resulting dry mass into an article before exposing the article to the nitriding gas, said forming being performed by a method selected from the group consisting of isopressing, dry pressing, extruding, and injection molding.

14. The process of claim 7, further comprising a step of placing the resultant dry mass into a furnace and filling the furnace with a combustible gas atmosphere while increasing the temperature from about room temperature to about 1000° C. over a time period from about 1 to about 5 hours while flowing the combustible gas therethrough, such that the organic additives are burned off without causing damage to the dry mass.

15. The process of claim 14, wherein said combustible gas atmosphere includes hydrogen gas.

16. The process of claim 1, wherein the composition of the nitriding gas remains substantially constant throughout the nitriding step by monitored addition of pure nitrogen.

17. The process of claim 1, wherein the nitriding gas includes pure nitrogen.

18. The process of claim 1, wherein the nitriding gas includes nitrogen and helium.

19. The process of claim 1, wherein the nitriding gas includes nitrogen, helium and hydrogen.

20. The process of claim 1, wherein said nitriding gas comprises from about 40 to about 60 mole percent nitrogen, from about 40 to about 60 mole percent helium, and from about 1 to about 4 mole percent hydrogen.

21. The process of claim 1, wherein said nitriding step is performed while heating at an increasing temperature rate of from about 5° C. to about 50° C. per hour until an elevated temperature of about 1350° C to about 1450° C. is reached.

22. The process of claim 21, wherein said nitriding step begins at about 1000° C. and is performed while heating at an increasing temperature rate of from about 5° C. to about 50° C. per hour until an elevated temperature of about 1350° C. to about 1450° C. is reached.

23. The process of claim 21, wherein the nitriding step is performed while the temperature rate is a 15°-25° C. increase per hour.

24. The process of claim 21, wherein the increasing temperature rate during nitriding is substantially linear.

25. The process of claim 1, further comprising holding the temperature achieved during the nitriding step between about 1350° C. to about 1450° C. for less than 2 hours.

26. The process of claim 1, wherein said conversion includes utilizing at least a nitrogen-containing atmosphere during the conversion.

27. The process of claim 1, wherein said conversion includes utilizing an atmosphere containing at least nitrogen and helium during the conversion.

28. A process for preparing an alpha-phase silicon nitride material and thereafter converting to non-densified beta-phase silicon nitride material, comprising:
   (a) comminuting a slurry including a mixture of
      (i) silicon-containing powder, and
      (ii) water,
      said comminuting being performed to form non-oxidized surfaces on the silicon powder and to allow chemical reaction between the silicon and the water;
   (b) reducing the water content of the reacted slurry to a degree sufficient to form a resultant dry mass;
   (c) nitriding the dry mass by exposure to a nitriding gas including at least nitrogen to form a mass of silicon nitride material which is predominantly in the alpha-phase; and
   (d) converting the resultant silicon nitride mass at a conversion temperature of from about 1450° C. to about 2100° C. to convert the silicon nitride from an alpha-phase material to non-densified beta phase silicon nitride material, wherein said conversion includes utilizing an atmosphere containing at least nitrogen and hydrogen during the conversion.

29. A process for preparing an alpha-phase silicon nitride material and thereafter converting to non-densified beta-phase silicon nitrode material, comprising:
   (a) comminuting a slurry including a mixture of
      (i) silicon-containing powder, and
      (ii) water,
      said comminuting being performed to form non-oxidized surfaces on the silicon powder and to allow chemical reaction between the silicon and the water;
   (b) reducing the water content of the reacted slurry to a degree sufficient to form a resultant dry mass;
   (c) nitriding the dry mass by exposure to a nitriding gas including at least nitrogen to form a mass of silicon nitride material which is predominantly in the alpha-phase; and
   (d) converting the resultant silicon nitride mass at a conversion temperature of from about 1450° C. to about 2100° C. to convert the silicon nitride from an alpha-phase material to non-densified beta phase silicon nitride material, wherein said conversion includes utilizing an atmosphere containing at least nitrogen, helium and hydrogen during the conversion.

30. The process of claim 1, wherein said conversion includes utilizing the same atmosphere as the atmospheric gas used during the nitriding step.

31. The process of claim 1, wherein said conversion includes utilizing an atmosphere containing substantially pure nitrogen.

32. The process of claim 1, wherein said conversion step is performed under vacuum from the end of the nitriding step to the beginning of the converting step, then an atmosphere containing at least nitrogen is admitted during the duration of the converting step.

33. The process of claim 1, wherein said conversion step is accomplished while utilizing the conversion atmosphere at a pressure of from vacuum to atmospheric pressure.

34. The process of claim 1, wherein said conversion step is accomplished while utilizing the conversion atmosphere at a pressure of from atmospheric to about 150 psig.

35. The process of claim 1, wherein said conversion step is accomplished while utilizing the conversion atmosphere at about 50 psig.

36. The process of claim 1, wherein said conversion step is accomplished while utilizing a conversion atmosphere including at least nitrogen at a partial pressure greater than 50 psig.

37. The process of claim 1, wherein said conversion step is accomplished while heating from the temperature achieved at the end of the nitriding step to the beginning of the conversion step at an increasing rate of from about 250° C. to about 1250° C. per hour until an elevated temperature of about 1450° C. to about 2100° C. is reached.

38. The process of claim 1, wherein said conversion step is accomplished while heating from the temperature achieved at the end of the nitriding step to the beginning of the conversion step at an increasing rate of from about 500° C. to about 1000° C. per hour until an elevated temperature of about 1450° C. to about 2100° C. is reached.

39. The process of claim 1, wherein said increasing rate includes about 500° C. per hour until the elevated temperature is reached.

40. The process of claim 1, wherein said conversion step is accomplished by maintaining a temperature of between about 1450° C. to about 2100° C. until the silicon nitride is converted to non-densified beta phase silicon nitride.

41. The process of claim 1, wherein said conversion step is accomplished by maintaining a conversion temperature of between about 1650° C. to about 1850° C. until the silicon nitride is converted to non-densified beta phase silicon nitride.

42. The process of claim 1, wherein said conversion step is accomplished by maintaining the conversion temperature for about 0.3 to about 20 hours until the silicon nitride is converted to non-densified beta phase silicon nitride.

43. The process of claim 1, wherein said conversion step is accomplished by maintaining a conversion temperature for about 5 to about 10 hours until substantially all of the silicon nitride is converted to non-densified beta phase silicon nitride.

44. A process for preparing an alpha-phase silicon nitride material and thereafter converting to non-densified beta-phase silicon nitride material, comprising:
  (a) comminuting a slurry including a mixture of
    (i) silicon-containing powder, and
    (ii) water,
    said comminuting being performed to form non-oxidized surfaces on the silicon powder and to allow chemical reaction between the silicon and the water;
  (b) reducing the water content of the reacted slurry to a degree sufficient to form a resultant dry mass;
  (c) nitriding the dry mass by exposure to a nitriding gas including at least nitrogen to form a mass of silicon nitride material which is predominantly in the alpha-phase; and
  (d) converting the resultant silicon nitride mass at a conversion temperature of from about 1450° C. to about 2100° C. to convert the silicon nitride from an alpha-phase material to non-densified beta phase silicon nitride material, wherein said conversion step is accomplished by maintaining the conversion temperature for about 1 to about 2 hours until substantially all of the silicon nitride is converted to non-densified beta phase silicon nitride.

45. The process of claim 1, further comprising cooling down the resulting non-densified silicon nitride mass from the conversion temperature to room temperature at a rate of from about 250° C. to about 1250° C. per hour.

46. The process of claim 45, wherein said cooling down occurs at a rate of from about 500° C. to about 1000° C. per hour until room temperature is reached.

47. The process of claim 45, wherein said cooling down occurs at about 500° C. per hour until room temperature is reached.

48. The process of claim 1, further comprising a step of adding at least one nitriding agent into the silicon and water slurry before the comminution step is completed.

49. The process of claim 48, wherein the at least one nitriding agent is selected from the group consisting of iron oxides, lead oxides, nickel carbonyl, nickel oxides, silicon carbide, graphite, carbon, aluminum oxides, $Fe_2O_3$, NiO, CoO, CaF, PbO, $Li_2O$, $Na_2O$, $K_2O$, BaO, BN, albite ($NaAlSi_3O_8$), orthclase ($KAlSi_3O_8$), anorthite ($CaAl_2Si_2O_8$), nepheline syenite, talc, borax, soda ash, $Pb_3O_4$, alpha-phase $Si_3N_4$ and mixtures thereof.

50. The process of claim 1, further comprising compacting the dry mass before nitriding.

51. The process of claim 1, further comprising compacting the mass of silicon nitride resulting form the nitriding step into a compacted article before the step of converting to beta-phase silicon nitride.

52. The process of claim 1, wherein the step of comminuting is accomplished by employing the slurry components in amounts such that the slurry contains about 10 to 60 volume percent solids and about 90 to 40 volume percent water.

53. A process for preparing an alpha-phase silicon nitride material and thereafter converting to non-densified beta-phase silicon nitride material, comprising:
  (a) comminuting a slurry including a mixture of
    (i) silicon-containing powder,
    (ii) water, and
    (iii) at least one nitriding agent selected from the group consisting of iron oxides, lead oxides, nickel carbonyl, nickel oxides, silicon carbide, graphite, carbon, aluminum oxides, $Fe_2O_3$, NiO, CoO, CaF, PbO, $Li_2O$, $Na_2O$, $K_2O$, BaO, BN, albite ($NaAlSi_3O_8$), orthclase ($KAlSi_3O_8$), anorthite ($CaAl_2Si_2O_8$), nepheline syenite, talc, borax, soda ash, $Pb_3O_4$, alpha-phase $Si_3N_4$ and mixtures thereof for aiding in further processing steps,
    said comminuting being performed to form non-oxidized surfaces on the silicon powder and to allow chemical reaction between the silicon and the water;
  (b) reducing the water content of the reacted slurry to a degree sufficient to form a resultant dry mass;
  (c) nitriding the dry mass by exposure to a nitriding gas including at least nitrogen to form a mass of silicon nitride material which is predominantly in the alpha-phase; and
  (d) heating the resultant silicon nitride mass at about 1450° C. to about 2100° C. to convert the silicon nitride from an alpha-phase material to a non-densified beta phase silicon nitride material.

* * * * *